United States Patent [19]

Ogawa et al.

[11] Patent Number: 5,146,671

[45] Date of Patent: Sep. 15, 1992

[54] METHOD OF MANUFACTURING FLOATING TYPE MAGNETIC HEAD

[75] Inventors: Takahiro Ogawa, Sennan; Atsushi Inoue, Yao; Kazuhiko Koga; Kiyotaka Ito, both of Daito; Yutaka Ueta, Yao, all of Japan

[73] Assignee: Sanyo Electric Co., Ltd., Moriguchi, Japan

[21] Appl. No.: 753,157

[22] Filed: Aug. 30, 1991

[30] Foreign Application Priority Data

Aug. 31, 1990 [JP] Japan ................................. 2-231676

[51] Int. Cl.⁵ ............................................... G11B 5/42
[52] U.S. Cl. ..................................... 29/603; 360/121; 360/127
[58] Field of Search ................... 29/603; 360/119–121, 360/126, 127

[56] References Cited

U.S. PATENT DOCUMENTS 4,890,378  1/1990  Suzuki et al.
5,016,341  5/1991  Ogawa et al. .......................... 29/603

FOREIGN PATENT DOCUMENTS 0328104  8/1989  European Pat. Off.
62-295207  12/1987  Japan .
62-246110  4/1988  Japan .

OTHER PUBLICATIONS

European Search Report.

Primary Examiner—Carl E. Hall
Attorney, Agent, or Firm—Armstrong, Nikaido, Marmelstein, Kubovcik & Murray

[57] ABSTRACT

A floating type composite magnetic head includes a head core fixed to a slider formed of nonmagnetic material. In the head core, a pair of magnetic core halves are abutted against each other with nonmagnetic material such as $SiO_2$ or the like interposed therebetween. The first and second magnetic core half members have first and second gap forming surfaces to be abutted against each other to define a magnetic gap (g), respectively. A first groove is formed on the second gap forming surface. A glass layer is formed in the first groove. A first thin film including a ferromagnetic metal thin film is selectively formed on the first gap forming surface. A second thin film including a ferromagnetic metal thin film is selectively formed on the second gap forming surface so that at least a portion except the surface of the glass layer in the second gap forming surface is exposed. A second groove is formed on the exposed second gap forming surface adjacent to the first groove. The first and second magnetic core half members are abutted and bonded with glass so that the first and second gap forming surfaces face each other so that the first and second thin films are abutted with $SiO_2$ or the like interposed therebetween to define a magnetic gap (g). Causes of occurrence and an increase of false gaps are suppressed and a decrease in manufacturing yield due to separation of thin films or the like can be prevented.

11 Claims, 11 Drawing Sheets

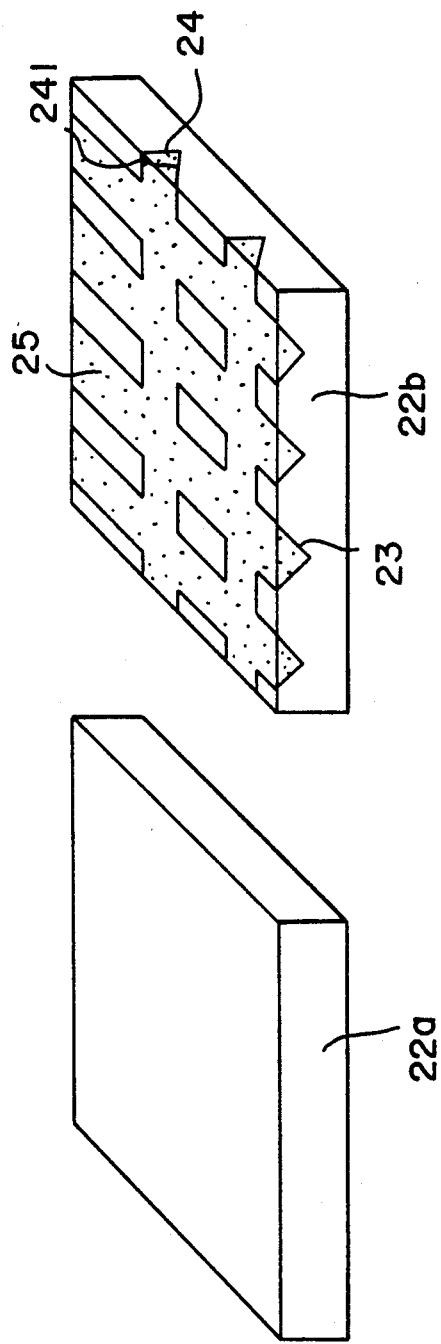
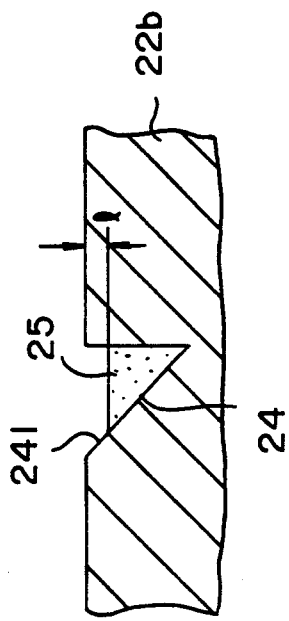
FIG.1(A)
FIG.1(B)
FIG.2

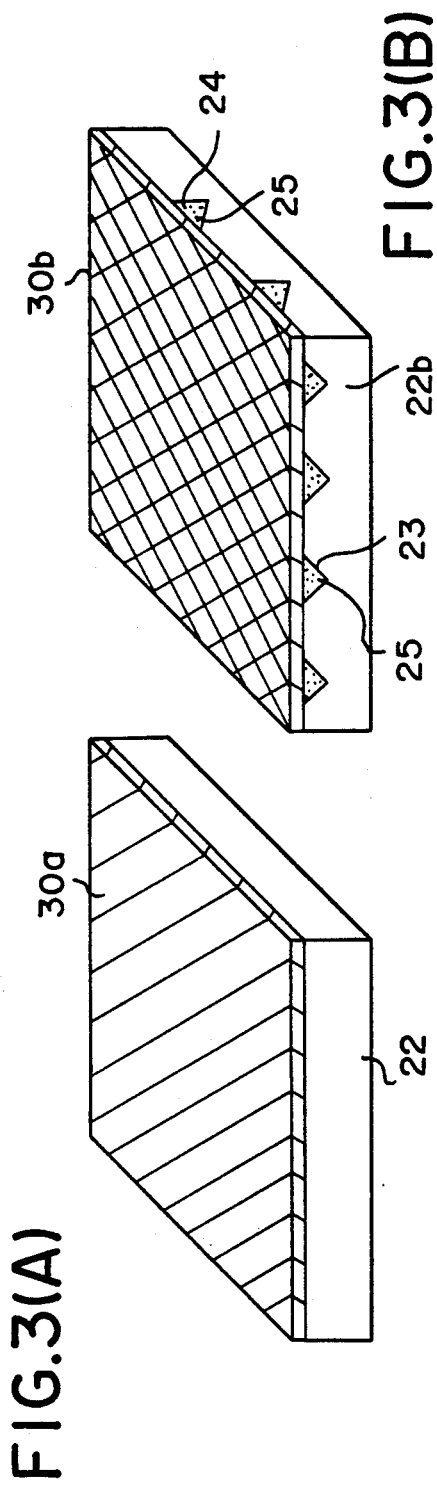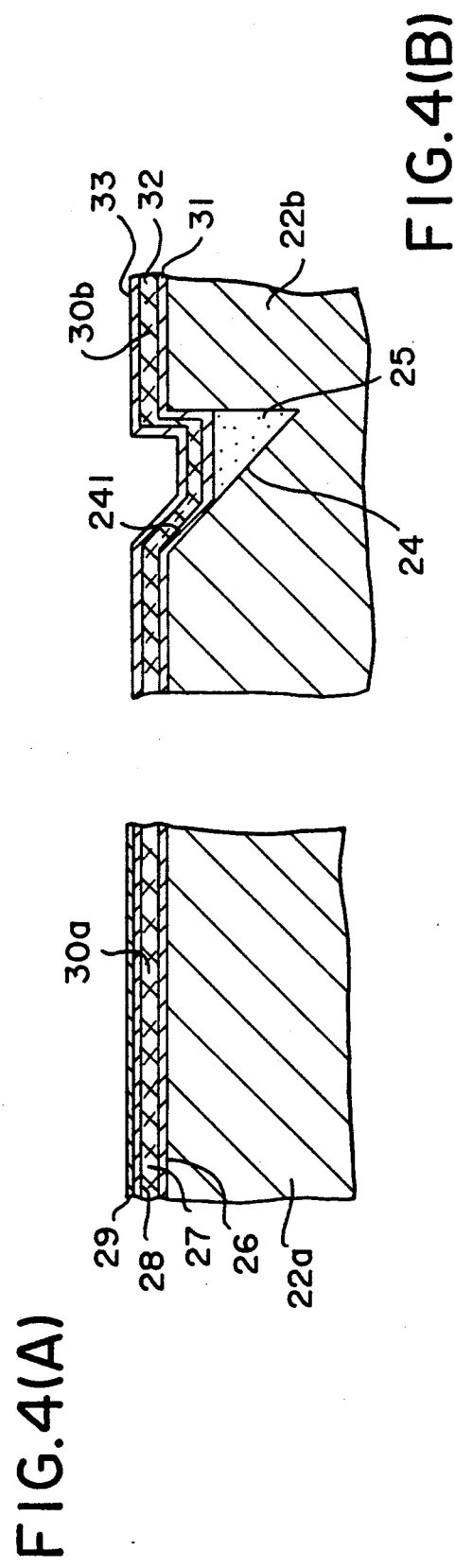

FIG.18(A)
PRIOR ART
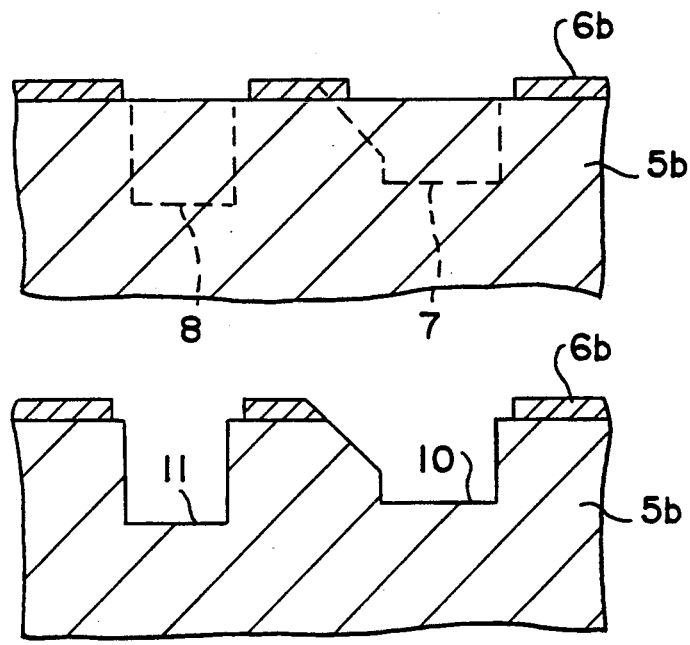
FIG.18(B)
FIG.19
PRIOR ART
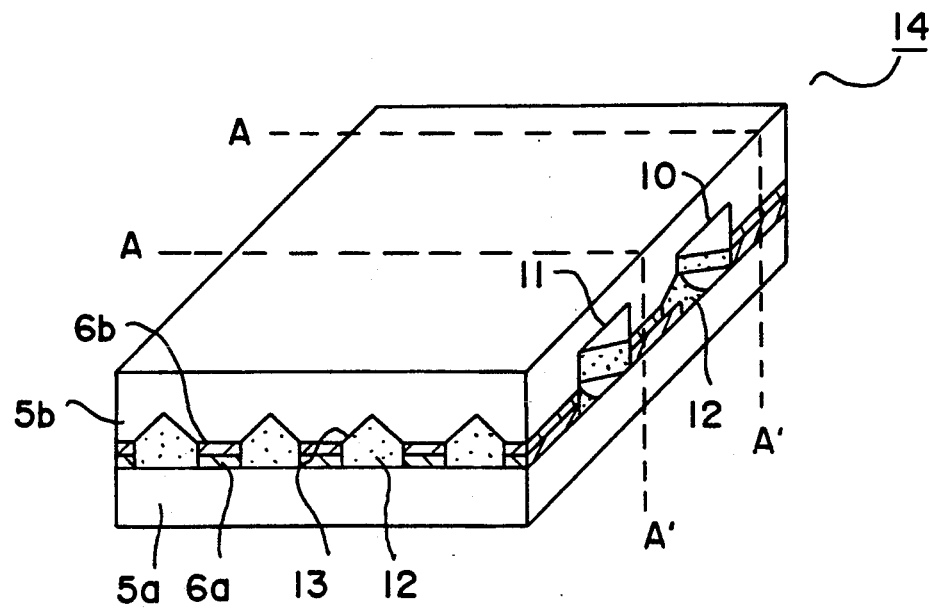

METHOD OF MANUFACTURING FLOATING TYPE MAGNETIC HEAD

BACKGROUND OF THE INVENTION

1. Field of the Invention

The present invention relates to a method of manufacturing floating type composite magnetic heads used for hard disc type recording media, and particularly to a method of manufacturing floating type magnetic heads of so-called MIG (Metal-In-Gap) type in which ferromagnetic metal thin films are provided in the vicinity of a gap for high density recording.

2. Description of the Background Art

Recently, there exists a great demand for miniaturization in a hard disc drive device, so that high density recording in recording media is one of important problems to be studied. Accordingly, metal thin film type magnetic discs with high coercive force (Hc) have been developed as recording media in place of conventional oxide type magnetic discs in which oxide is provided. A magnetic head adapted to such a magnetic disc of metal thin film type is disclosed in Japanese Patent Laying Open No. 62-295207, for example. A floating type magnetic head of MIG type (Metal-In-Gap type) is proposed in the literature. In the MIG type floating type magnetic head, a film of high saturation magnetic flux density material such as Sendust, amorphous magnetic alloy or the like is formed by sputtering on a surface, on which a gap is formed, of a floating type magnetic head of conventional monolithic type or composite type.

FIG. 14 is a perspective view illustrating external appearance of a head core of a conventional floating type magnetic head of MIG type. As shown in FIG. 14, a head core 3 includes a pair of core halves 1a and 1b. The pair of core halves 1a and 1b are abut against each other with nonmagnetic material interposed therebetween. The pair of core halves 1a and 1b are formed of oxide magnetic material such as ferrite. A magnetic gap g is defined between the pair of magnetic core halves 1a and 1b. A ferromagnetic metal thin film 2 formed of Sendust or the like is formed by sputtering or the like on a gap forming surface of the I type core half 1a having no coil groove. Ferromagnetic metal thin film 2 is thus formed only on the gap forming surface of core half 1a.

With the coercive force (Hc) of recording media of about 1200 oersted (Oe), especially about 1500 oersted (Oe), the recording ability and overwrite performance of head core 3 having such a structure as shown in FIG. 14 for the recording media are insufficient. Accordingly, a head core as shown in FIG. 15 is proposed. The head core 4 includes an I type core half 1a and C type core half 1b. Ferromagnetic metal thin films 6a and 6b are formed on the gap forming surfaces of both of core halves 1a and 1b.

Next, a method of manufacturing a floating type magnetic head employing a head core having such structure as shown in FIG. 15 will be described. FIGS. 16–23 are perspective views and cross sectional views sequentially indicating structure in respective manufacturing steps of a conventional floating type magnetic head.

First, as shown in FIGS. 16(A)(B), specular polishing is applied to upper and lower surfaces of a first substrate 5a and a lower surface of a second substrate 5b formed of Mn-Zn ferrite. Subsequently, a first thin film 6a is formed by sputtering or the like on the upper surface as a gap forming surface of first substrate 5a to be an I type core half. The first thin film 6a is formed of a ferromagnetic metal thin film, a gap spacer such as a $SiO_2$ film or the like and a glass film for bonding. A second thin film 6b is formed by sputtering or the like on the upper surface as a gap forming surface of second substrate 5b to be a C type core half. The second thin film 6b is formed of a ferromagnetic metal thin film and a gap spacer such as a $SiO_2$ film.

Next, as shown in FIGS. 17(A)(B), the first thin film 6a and the second thin film 6b are patterned. The patterning is performed by removing the first and second thin films 6a and 6b by ionmilling or the like. Subsequently, coil grooves 7 are formed at portions indicated with broken lines in second substrate 5b. Glass rod receiving grooves are formed at portions indicated with broken lines 8 in the second substrate 5b. Extra processing grooves are formed at portions indicated with broken lines 9 in the second substrate 5b. FIG. 18(A) is a partial sectional view illustrating the second substrate 5b before grooves are formed. FIG. 18(B) is a partial sectional view showing the second substrate 5b in which coil groove 10 and glass rod receiving groove 11 are formed.

As shown in FIG. 19, the first and second substrates 5a and 5b are abutted against each other so that the first and second thin films 6a and 6b face each other. A glass rod is inserted into glass rod receiving groove 11, and a glass layer 12 is formed by melting, flowing and solidifying the glass. Bonding the first and second substrates 5a and 5b with glass in this way, a block 14 is formed.

The block 14 is cut along the broken lines A—A'. Thus, a core block 15 at the slicing stage is formed as shown in FIG. 20. Oblique line portions 16 are cut off in the core block 15. Both of the cut faces are polished to produce a plurality of head cores 4 as shown in FIG. 21. Next, as shown in FIG. 22, a groove 18 is formed on the upper portion of head core 4. The width of a convex portion facing a medium 17, that is a track width $T_w$ is defined. Subsequently, as shown in FIG. 23, head core 4 is attached in and fixed to a slit 20 of a slider 19 formed of nonmagnetic material with a glass layer 21. The outer form of slider 19 is worked to complete the floating type magnetic head.

However, according to the above described conventional manufacturing method, problems as will be described below occur. In the processing steps of coil grooves 10 shown in FIGS. 17 and 18, second thin film 6b is directly cut by a diamond grinding wheel rotating at a high speed. The adhesive strength of the second thin film 6b to the second substrate 5b is weak. Accordingly, the second thin film 6b may be completely separated or may be raised from the surface of the second substrate 5b as shown in FIG. 24. As a result, the manufacturing yield of magnetic heads decreases. Also, the rise of second thin film 6b may cause false (secondary) gaps.

Furthermore, according to the above described method of manufacturing magnetic heads, the glass bonding shown in FIG. 19 is made by completely melting a glass rod inserted between a pair of core halves and flowing the melted glass into extra-processing grooves 13 and so forth. Accordingly, glass bonding temperature is higher than a softening point of glass by 150° C. or more. As a result, the reaction proceeds at interfaces between the first and second substrates 5a and 5b, and first and second thin films 6a and 6b at the glass bonding process. Accordingly, there exists a problem that the false gaps are large.

SUMMARY OF THE INVENTION

It is an object of the present invention to suppress a cause of occurrence or an increase of false gaps in a method of manufacturing floating type magnet heads.

It is another object of the present invention to prevent separation and rise of thin films due to coil groove working to enhance manufacturing yield in the method of manufacturing floating type magnetic heads.

It is still another object of the present invention to restrain an increase in false gaps due to heating in glass bonding process in a method of manufacturing floating type magnetic heads.

A method of manufacturing floating type magnetic heads according to the present invention includes the following steps.

(a) A step of preparing first and second magnetic core half members including ferromagnetic oxide and having first and second gap forming surfaces to be abutted against each other to define magnetic gaps, respectively.

(b) A step of forming a first groove on the second gap forming surface.

(c) A step of forming a glass layer inside the first groove.

(d) A step of selectively forming a first thin film including a ferromagnetic metal thin film on the first gap forming surface.

(e) A step of selectively forming a second thin film including a ferromagnetic metal thin film on the second gap forming surface so that at least a portion but the surface of the glass layer in the second gap forming surface is exposed.

(f) A step of forming a second groove on said exposed second gap forming surface adjacent the first groove.

(g) A step of abutting and bonding with glass the first and second magnetic core half members so that the first and second gap forming surfaces face each other so that the first and second thin films are bonded with nonmagnetic material interposed therebetween to define a magnetic gap.

According to a preferable embodiment of the present invention, the step of forming a first groove includes forming an extra processing groove and an apex (gap depth regulating) groove. The step of forming the second groove includes forming a coil groove. The coil groove is formed adjacent the apex groove. The step of forming a glass layer inside the first groove includes steps of filling glass inside the apex groove and forming difference in level between the surface of the glass layer and the second gap forming surface inside the apex groove by partially removing the filled glass. The step of selectively forming the second thin film includes forming the second thin film on a sidewall surface of the apex groove.

In the present invention, a coil groove as a second groove is formed in the exposed second gap forming surface adjacent the first groove. A glass layer is formed in advance inside the first groove. Accordingly, the second thin film is not cut due to formation of the second groove, which prevents it from being separated and raised from the second gap forming surface.

Also, in the present invention, a glass layer is formed in advance inside the first groove. Accordingly, the glass bonding of the first and second magnetic core half members is made by melting and solidifying the glass layer formed inside the first groove. The glass bonding between the first and second magnetic core half members can be made at relatively low temperature.

Furthermore, according to a preferable embodiment of the present invention, a second thin film is formed on a sidewall surface of the apex groove. Accordingly, the magentic flux flow is facilitated in the ferromagnetic metal thin film in a completed magnetic head.

As described above, according to the present invention, causes of occurrence and an increase of false gaps can be suppressed and also a decrease in the manufacturing yield due to separation of thin films and so forth can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1, 2, 3, 4, 5, 6, 7, 8, 9, 10, 11, 12 and 13 are perspective views and sectional views sequentially showing structure according to respective manufacturing steps in the method of manufacturing a floating type magnetic head by one embodiment of the present invention.

FIGS. 16, 17, 18, 19, 20, 21, 22 and 23 are perspective views and sectional views sequentially showing structure according to respective manufacturing steps in a conventional method of manufacturing a floating type magmatic head.

DESCRIPTION OF THE PREFERRED EMBODIMENTS

Figures 5A, 5B:
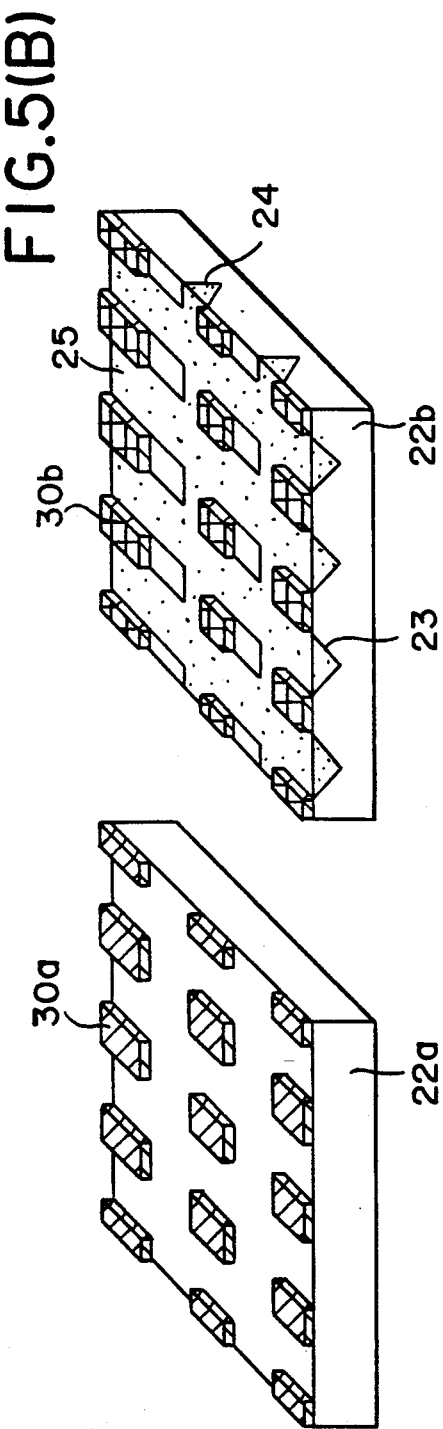

Referring to the figures, one embodiment of the present invention will be described in detail.

First, referring to FIGS. 1(A)(B), a first substrate 22a and a second substrate 22b formed of Mn-Zn ferrite are prepared. Specular polishing is applied to upper and lower surfaces of first substrate 22a and a lower surface of second substrate 22b. Subsequently, extra processing grooves 23 and apex grooves 24 having oblique surfaces 241 are formed on the upper surface as a gap forming surface of the second substrate 22b to be a C type core half. First glass 25 is filled in extra processing grooves 23 and apex grooves 24. Specular polishing is applied to the upper surface of the second substrate 22b. In the embodiment, the first glass 25 is provided by holding glass having a softening point of 590° C. at 690° C. for 40 minutes.

Next, etching processing is applied to the upper surface of the second substrate 22b. Upper portion of the glass 25 filled in extra processing grooves 23 and apex grooves 24 is thus removed. In this way, as shown in the sectional view of FIG. 2, the difference in level 1 is provided. In this embodiment, the etching process is performed using a HF (HydroFluoric acid) acqueous solution of concentration of 1%. The difference in level 1 of 10 μm is thus formed. If the difference 1 is too large, glass is not filled sufficiently to corners of lower ends of gaps in the later glass bonding process. If the difference l is too small, the mask alignment is difficult in patterning a ferromagnetic metal thin film in the later step.

As shown in FIGS. 3(A)(B) and 4(A)(B), a first thin film 30a is formed by sputtering all over the upper surface of first substrate 22a. The first thin film 30a is formed of an underlying layer 26 such as SiO₂ or the like, a ferromagnetic metal thin film 27 such as Sendust or the like, a gap spacer 28 such as SiO₂ or the like and second glass 29 for gap bonding. A second thin film 30b is formed all over the upper surface of second substrate 22b by sputtering. The second thin film 30b is formed of an underlying layer 31 such as SiO₂ or the like, a ferromagnetic metal thin film 32 such as Sendust or the like and a gap spacer 33 such as SiO₂ or the like. In the present embodiment, the softening point of the second glass 29 is 640° C. The film of second glass 29 has a thickness of 500Å, which is formed by the RF magnetron type sputter method. In the first and second thin films 30a and 30b, the film thickness of underlying layers 26, 31 is 50Å, the film thickness of ferromagnetic metal thin films 27, 32 is 2.5 $\mu$m, and the film thickness of gap spacers 28, 33 is 0.25 $\mu$m.

Figure 7:
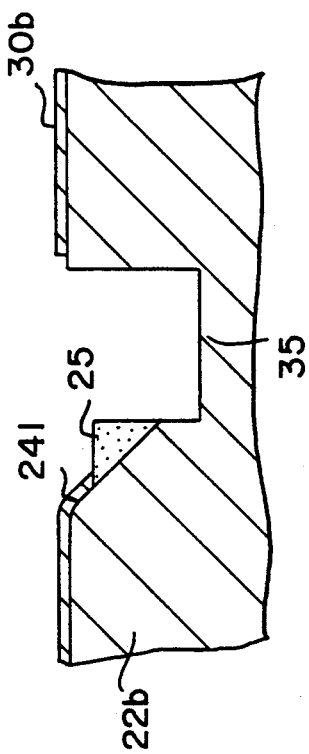
Figure 6:
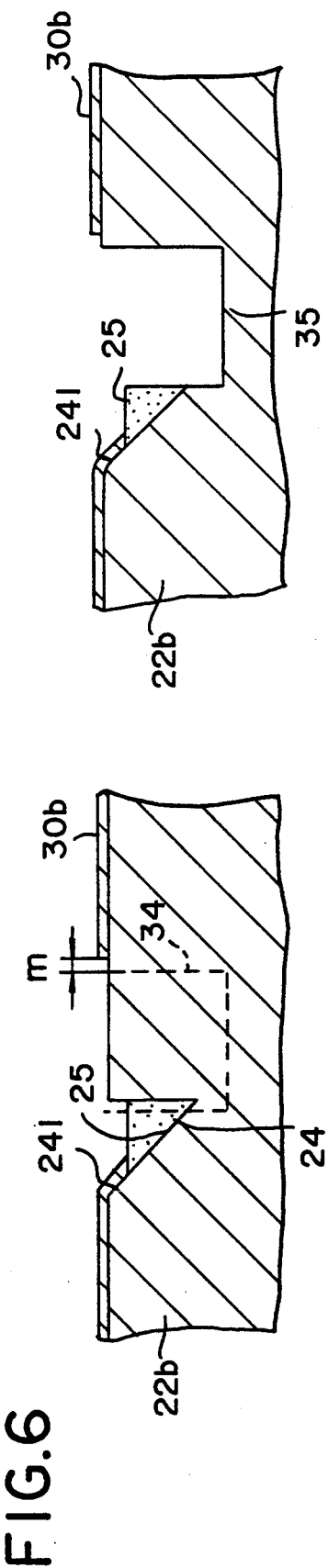

As shown in FIGS. 5(A)(B), first thin film 30a and second thin film 30b are patterned. The patterning of second thin film 30b is performed by removing by ionmilling or the like second thin film 30b provided on a portion in which first glass 25 is filled and a portion at which coil grooves are to be formed. The patterning of first thin film 30a is performed by removing by ionmilling or the like corresponding portions similarly to the patterning of second thin film 30b. FIG. 6 is a partial section view showing a condition in which the ionmilling process is applied to second substrate 22b. In FIG. 6, a coil groove 35 is formed at a portion designated by a broken line 34 distant from an end portion of second thin film 30b by the distance m. Coil groove 35 is thus formed as shown in FIG. 7. In the present embodiment, the distance m is set 30 $\mu$m so that a cutting wheel for coil groove work does not contact with the thin film.

Figure 8:
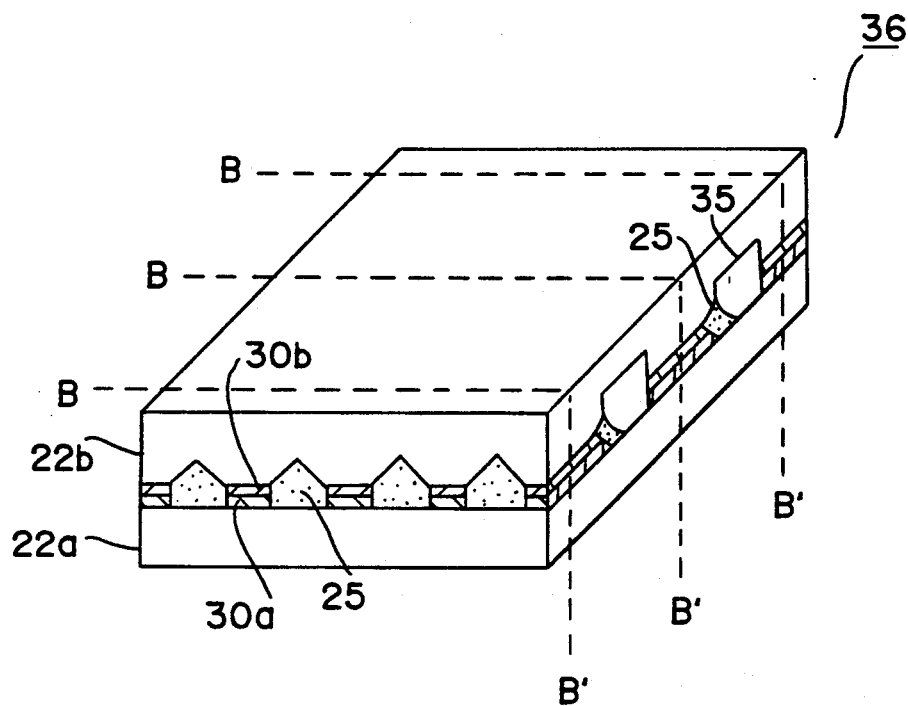
Figure 9:
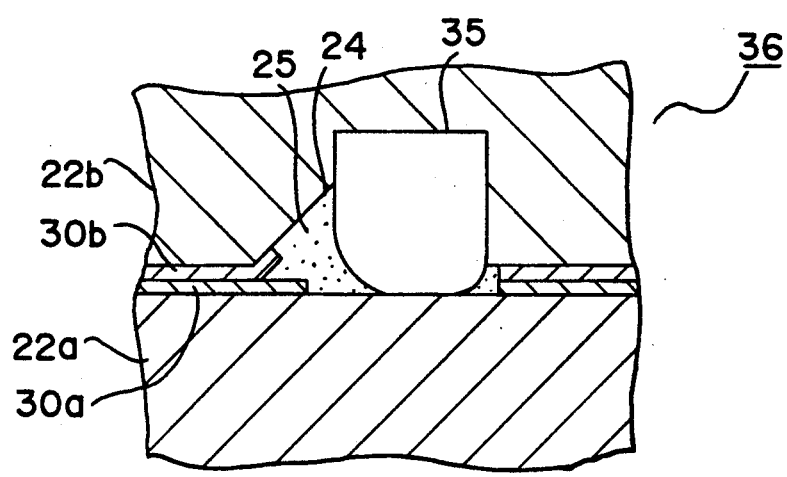

As shown in FIG. 8, the first and second substrates 22a and 22b are abutted against each other so that the first and second thin films 30a and 30b face to each other. In this condition, first glass 25 and second glass 29 (not shown in FIG. 8 but shown in FIG. 4) are melted and solidified to bond the first and second substrates 22a and 22b. A block 36 is thus formed. In the present embodiment, the glass bonding is made by holding it at a peak temperature of 700° C. for 10 minutes. FIG. 9 is a main portion section view showing the block 36 after glass bonding.

Figure 10:
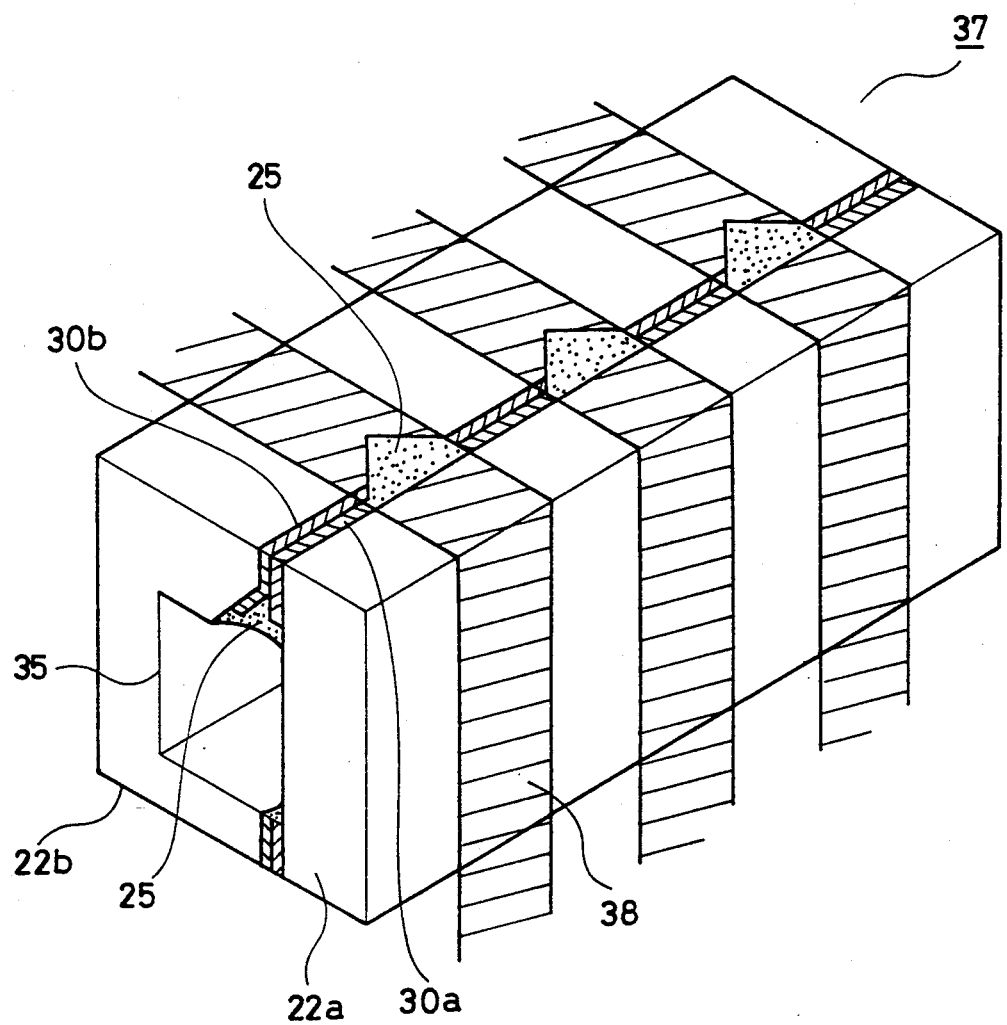
Figure 11:
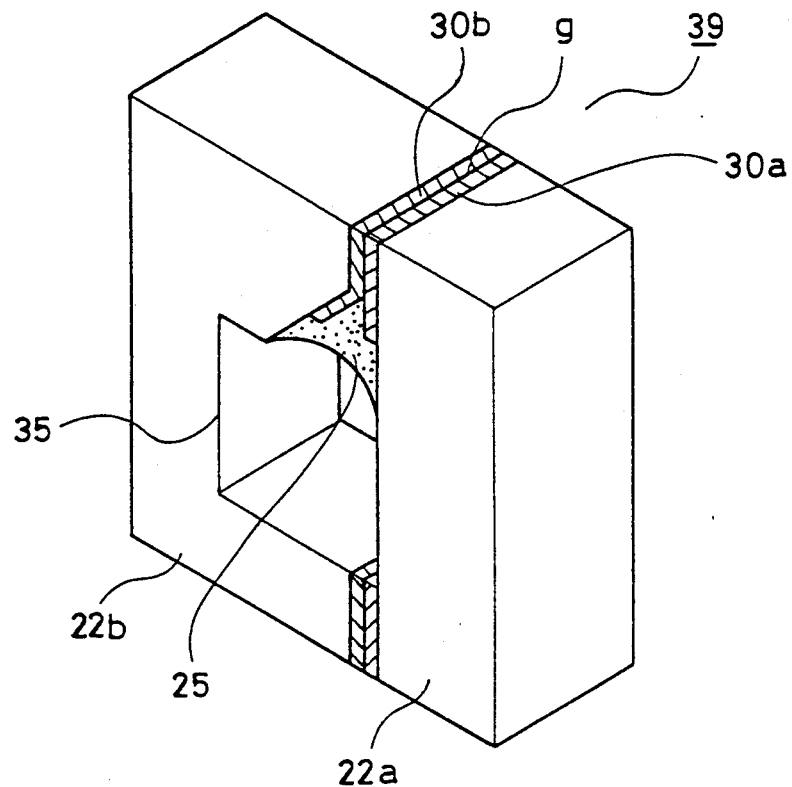

Next, block 36 is cut off along the broken lines B—B' shown in FIG. 8. A core block 37 is thus formed as shown in FIG. 10. The external appearance of core block 37 is worked and formed to desired dimensions. Subsequently, by cutting and removing oblique line portions 38 in core block 37, a plurality of head cores 39 as shown in FIG. 11 are produced.

Figure 12:
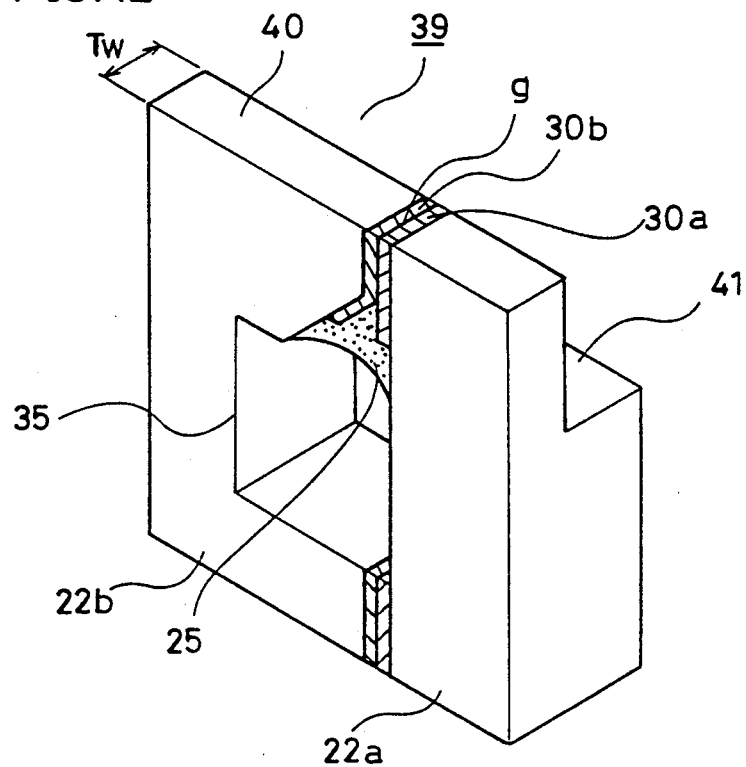

Both sides of head core 39 are polished. Subsequently, as shown in FIG. 12, similarly to the conventional example, a groove 41 is formed on an upper portion of head core 39. The groove 41 defines the width of convex portion facing to medium 40, that is, the track width $T_w$ on the upper portion of head core 39.

Figure 13:
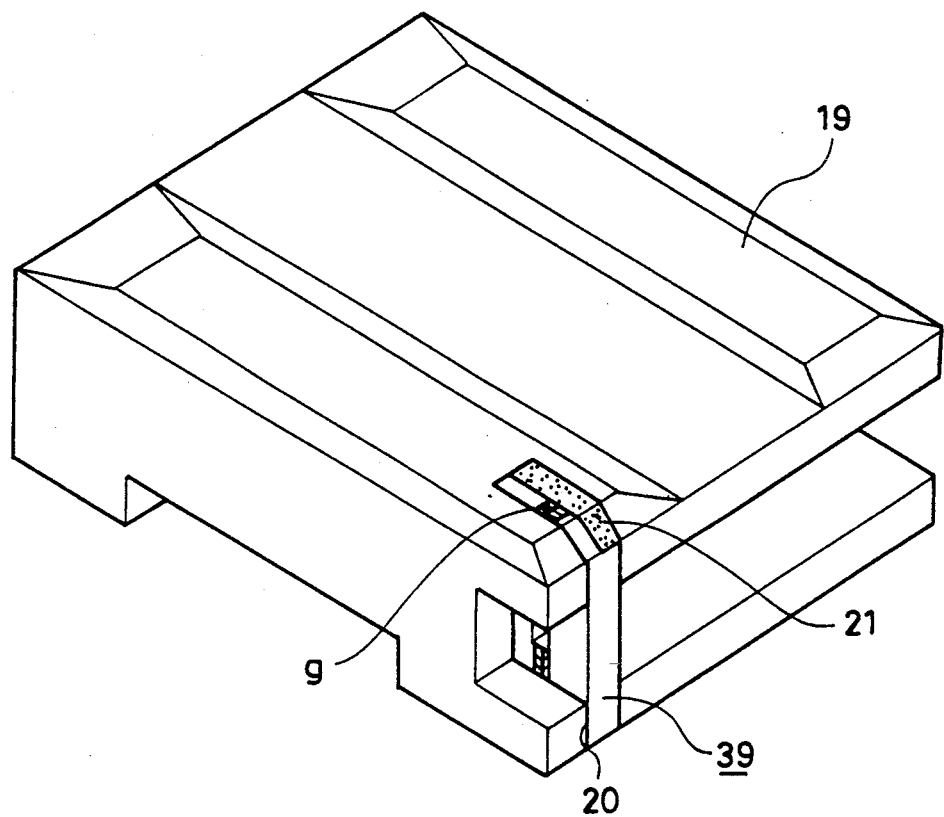
Figure 14:
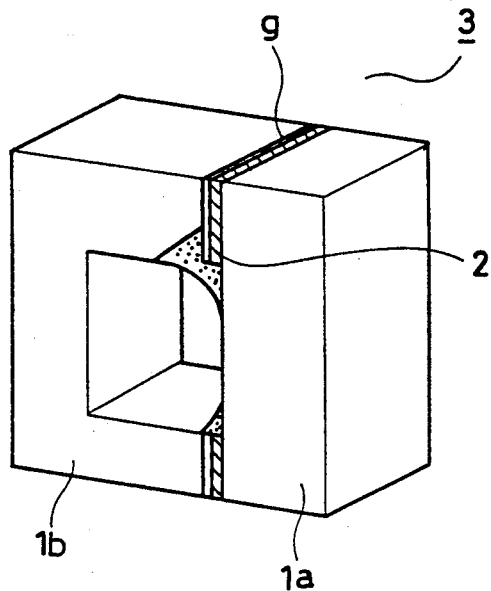
FIGS. 14 and 15 are perspective views showing external appearance of a head core of a conventional floating type magnetic head.
Figure 15:
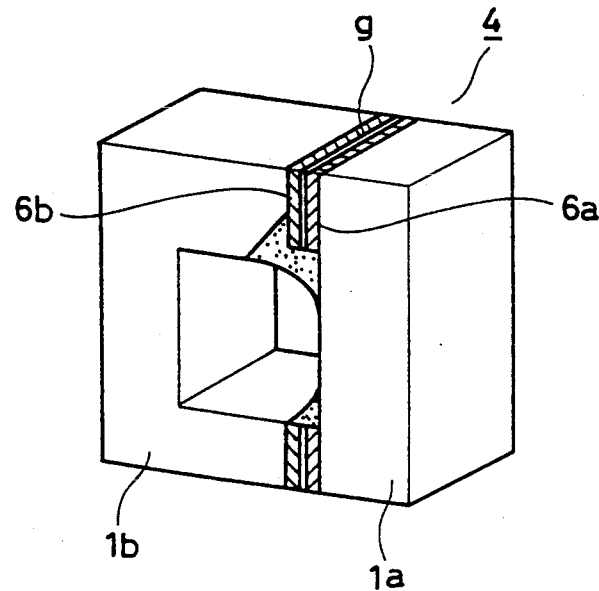
Figure 16A:
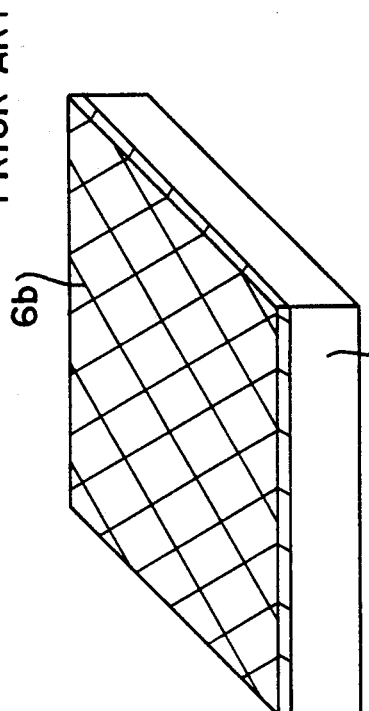
Figure 16B:
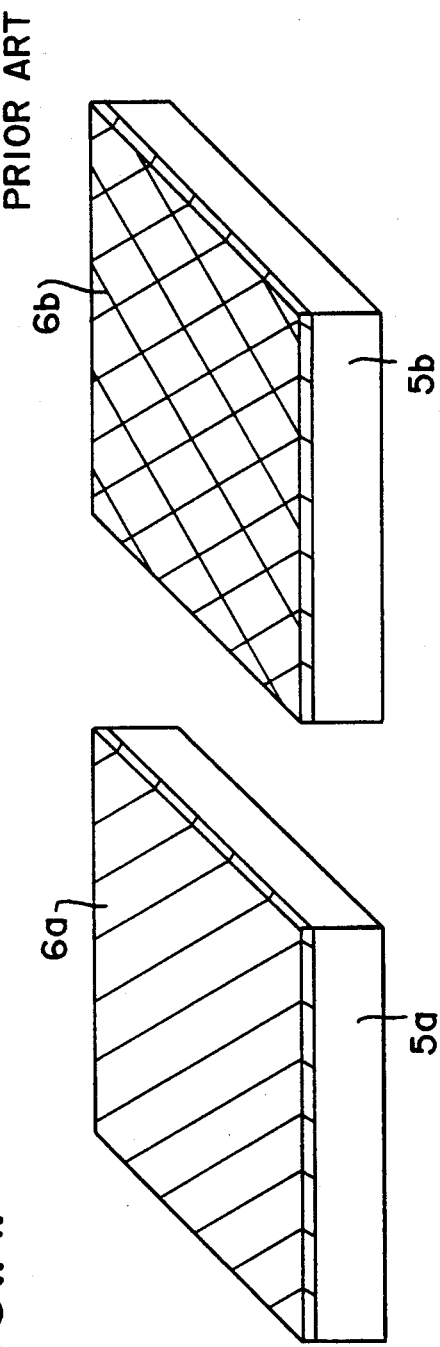
Figure 17A:
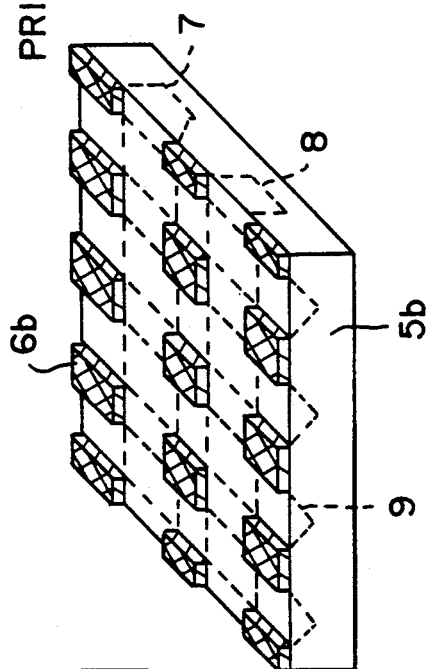
Figure 17B:
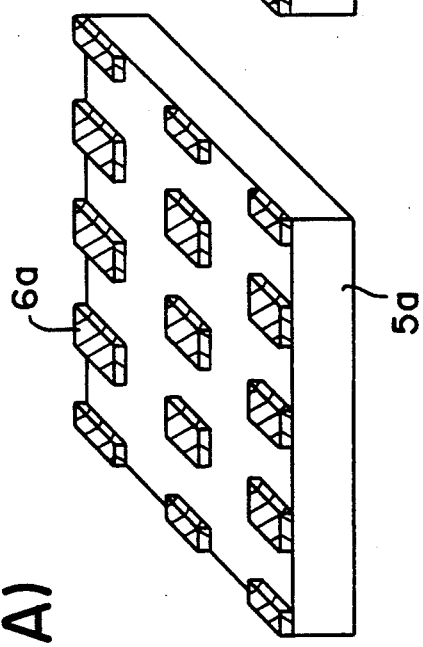
Figure 20:
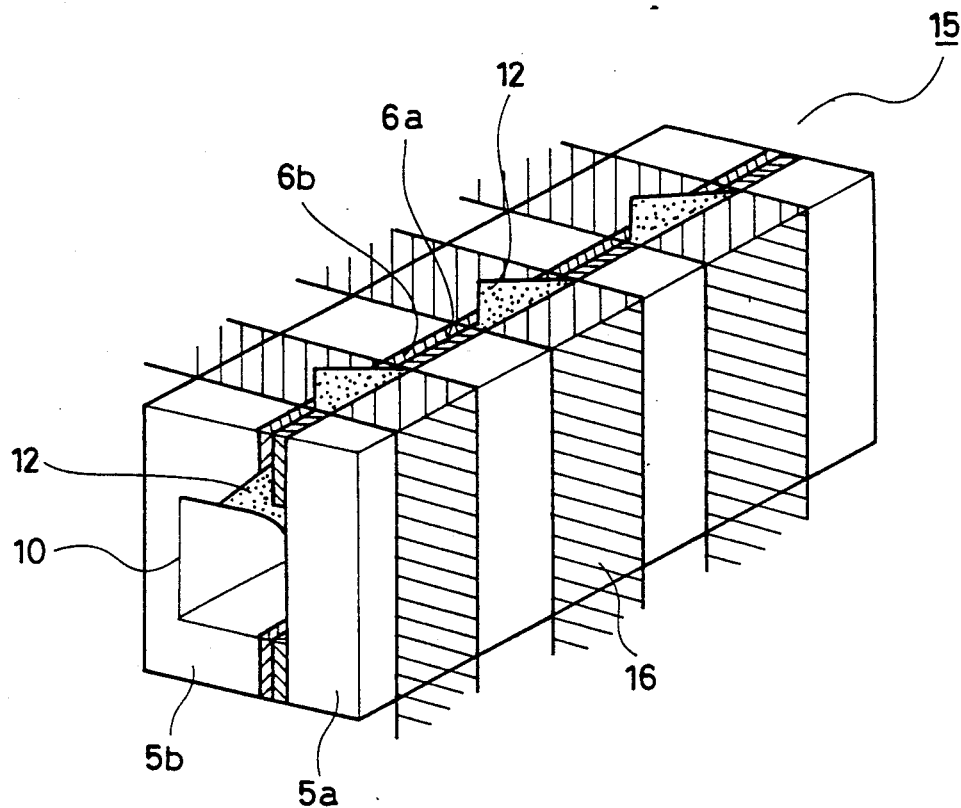
Figure 21:
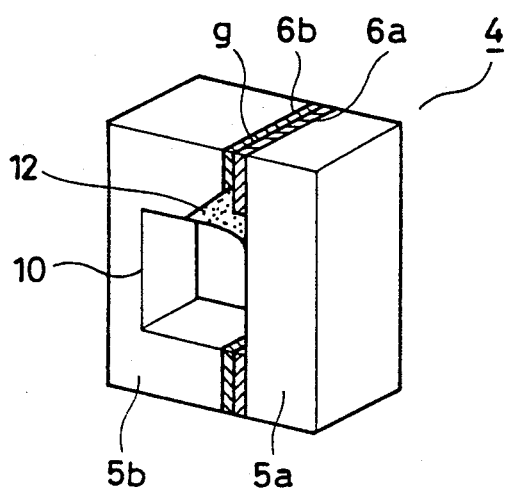
Figure 22:
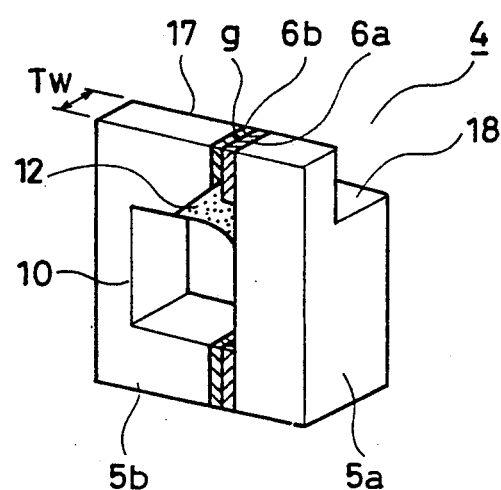
Figure 23:
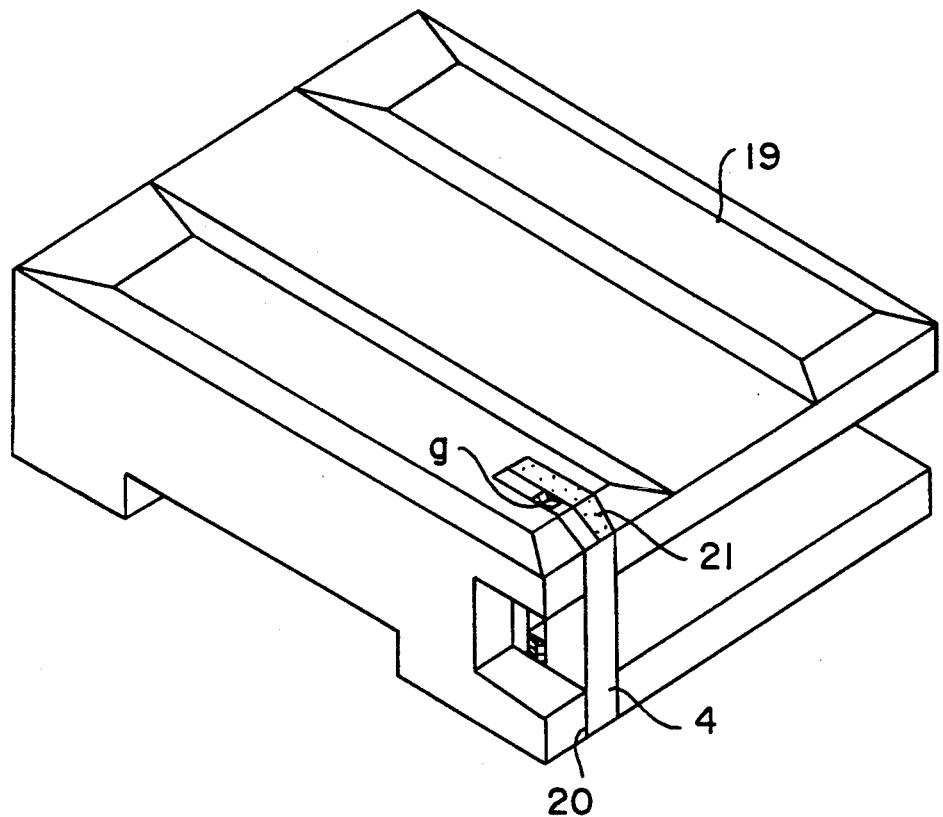
Figure 24:
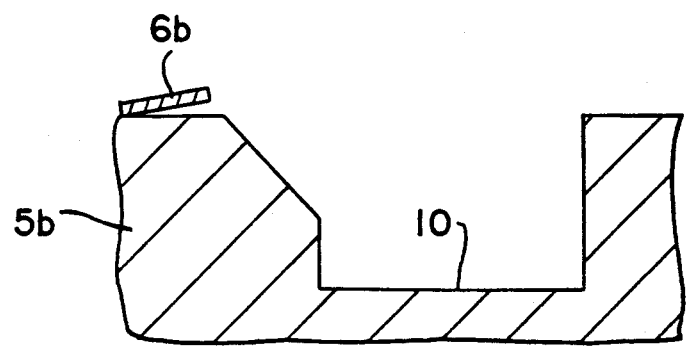
FIG. 24 is a partial sectional view showing a condition in which a thin film is raised from a substrate in the conventional process of manufacturing a floating type magnetic head.

Finally, as shown in FIG. 13, head core 39 is provided and fixed with third glass 21 in a slit 20 of a slider 19 formed of nonmagnetic material. Subsequently, the outer shape of slider 19 is worked to complete a floating type magnetic head.

In the method of manufacturing floating type magnetic heads as described above, as shown in FIGS. 2-4, by removing the upper portion of first glass 25 filled in apex groove 24, the difference in level l is provided. Subsequently, second thin film 30b is formed all over the upper surface of second substrate 22b including a surface of first glass 25. As shown in FIG. 5, second thin film 30b provided on first glass 25 is selectively removed. Thus, as shown in FIG. 6, second thin film 30b is formed extending on to the oblique surface 241 of apex groove 24. As a result, in a completed magnetic head, flux flow is facilitated in the ferromagnetic metal thin film.

Also, as shown in FIG. 6, after patterning second thin film 30b, a coil groove 35 is formed at a portion distant from an end portion of the remaining second thin film 30b by the distance m. Accordingly, a cutting wheel for working grooves does not contact with second thin film 30b. Furthermore, coil groove 35 is formed adjacent to apex groove 24. First glass 25 is formed in apex groove 24. Thus, in the process of forming coil grooves, a diamond grinding wheel rotating at a high speed does not directly cut second thin film 30b. As a result, separation and rise of second thin film 30b are prevented.

Furthermore, in the manufacturing method of the present embodiment, the first and second substrates 22a and 22b are bonded with glass by melting and solidifying first glass 25 previously filled in the groove. Accordingly, as compared to the conventional method in which glass rods are inserted and melted, the melting and bonding temperature can be decreased. Reaction at the interfaces between the first and second substrates 22a, 22b and ferromagnetic metal thin films 27, 32 in the first and second thin films 30a and 30b can be thus suppressed. As a result, an increase of false gaps can be restrained in a completed magnetic head.

As described above, according to the present invention, causes of occurrence and an increase of false gaps can be suppressed and also a decrease in manufacturing yield of magnetic heads due to separation and rise of thin films can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a floating type magnetic head having a magnetic gap (g) between a pair of magnetic core halves mutually abutted with nonmagnetic material interposed therebetween and including a head core fixed to a slider formed of nonmagnetic material, comprising steps of:

preparing first and second magnetic core half members including ferromagnetic oxide and respectively having first and second gap forming surfaces to be abutted against each other to defined said magnetic gap (g);

forming a first groove on said second gap forming surface;

forming a glass layer inside said first groove by the steps of (1) filling glass inside an apex groove, and (2) forming difference in level (l) between the surface of the glass layer and said second gap forming surface inside said apex groove by partially removing said filled glass;

selectively forming a first thin film including a ferromagnetic metal thin film on said first gap forming surface;

selectively forming a second thin film including a ferromagnetic metal thin film on said second gap forming surface so that a portion except a surface of said glass layer in said second gap forming surface is at least exposed;

forming a second groove on said exposed said second gap forming surface adjacent said first groove; and abutting and bonding with glass said first and second magnetic core half members so that said first and second gap forming surfaces face each other to define said magnetic gap by bonding said first and second thin films with nonmagnetic material interposed therebetween.

2. The method of manufacturing the floating type magnetic head according to claim 1, wherein the step of forming said first groove includes forming an extra processing groove and said apex groove.

3. The method of manufacturing the floating type magnetic head according to claim 2, wherein the step of forming said second groove includes forming a coil groove.

4. The method of manufacturing the floating type magnetic head according to claim 3, wherein the step of forming said second groove includes forming said coil groove adjacent said apex groove.

5. The method of manufacturing the floating type magnetic head according to claim 1, wherein the step of selectively forming said second thin film includes forming a second thin film on a sidewall surface of said apex groove.

6. The method of manufacturing the floating type magnetic head according to claim 1, wherein the step of selectively forming said first thin film comprises the steps of, forming a first thin film including a ferromagnetic metal thin film all over said first gap forming surface, and selectively removing said first thin film.

7. The method of manufacturing the floating type magnetic head according to claim 6, wherein the step of selectively removing said first thin film comprises removing the first thin film by ionmilling.

8. The method of manufacturing the floating type magnetic head according to claim 6, wherein the step of forming said first thin film includes sequentially forming an underlying layer formed of nonmagnetic material, a ferromagnetic metal thin film, a gap spacer formed of nonmagnetic material and a glass layer for gap bonding on said first gap forming surface.

9. The method of manufacturing the floating type magnetic head according to claim 1, wherein the step of selectively forming said second thin film comprises the steps of, forming a second thin film including a ferromagnetic metal thin film on the entirety of said second gap forming surface including the surface of said glass layer, and selectively removing said second thin film.

10. The method of manufacturing the floating type magnetic head according to claim 9, wherein the step of selectively removing said second thin film includes removing the second thin film by ionmilling.

11. The method of manufacturing the floating type magnetic head according to claim 9, wherein the step of forming said second thin film comprises sequentially forming an underlying layer formed of nonmagnetic material, a ferromagnetic metal thin film, and a gap spacer formed of nonmagnetic material on said second gap forming surface.

* * * * *